United States Patent [19]
Everaerts et al.

[11] Patent Number: 5,648,425
[45] Date of Patent: Jul. 15, 1997

[54] REMOVEABLE, LOW MELT VISCOSITY ACRYLIC PRESSURE SENSITIVE ADHESIVES

[75] Inventors: Albert I. Everaerts, Oakdale; Jeffrey D. Malmer, North St. Paul, both of Minn.

[73] Assignee: Minnesota Mining and Manufacturing Company, St. Paul, Minn.

[21] Appl. No.: 256,252

[22] PCT Filed: Dec. 21, 1992

[86] PCT No.: PCT/US92/11156

§ 371 Date: Nov. 28, 1994

§ 102(e) Date: Nov. 28, 1994

[87] PCT Pub. No.: WO93/13148

PCT Pub. Date: Jul. 8, 1993

Related U.S. Application Data

[63] Continuation of Ser. No. 816,593, Dec. 31, 1991, abandoned.

[51] Int. Cl.$^6$ ........................ C08F 8/30
[52] U.S. Cl. ........................ 515/100; 515/103; 515/281; 515/293; 515/300; 515/301; 515/305; 515/328.2; 515/329.2; 515/329.4; 515/329.7; 515/329.8; 515/329.9; 515/330.1; 515/359.2; 515/375; 515/383
[58] Field of Search ........................ 525/281, 305, 525/329.7, 329.8, 329.9, 330.1, 100, 103, 293, 300, 301, 328.2, 329.2, 329.4

[56] References Cited

U.S. PATENT DOCUMENTS

| | | | |
|---|---|---|---|
| 3,008,850 | 11/1961 | Ulrich | 117/122 |
| 3,635,754 | 1/1972 | Beede | 117/122 |
| 3,691,140 | 9/1972 | Silver | 260/78.5 |
| 3,707,518 | 12/1972 | Bemmels et al. | 260/29.6 |
| 3,900,674 | 8/1975 | Coffman | 428/355 |
| 3,983,297 | 9/1976 | Ono et al. | 428/355 |
| 4,038,454 | 7/1977 | Lehmann et al. | 428/356 |
| 4,201,808 | 5/1980 | Cully | 522/99 |
| 4,379,201 | 4/1983 | Heilmann | 522/182 |
| 4,554,324 | 11/1985 | Husman et al. | 525/301 |
| 4,599,265 | 7/1986 | Esmay | 428/355 |
| 4,737,559 | 4/1988 | Kellen et al. | 526/291 |
| 5,004,768 | 4/1991 | Mahil et al. | 524/30 |
| 5,045,569 | 9/1991 | Delgado | 521/60 |
| 5,073,611 | 12/1991 | Rehmer | 522/36 |
| 5,156,911 | 10/1992 | Stewart | 525/324.4 |

FOREIGN PATENT DOCUMENTS

| | | |
|---|---|---|
| 0109177 | 5/1984 | European Pat. Off. . |
| 308203 | 3/1989 | European Pat. Off. . |
| 3935097A1 | 4/1991 | Germany . |
| 2256815 | 12/1992 | United Kingdom . |
| WO90/13420 | 11/1990 | WIPO . |
| WO91/18739 | 12/1991 | WIPO . |

*Primary Examiner*—Bernard Lipman
*Attorney, Agent, or Firm*—Gary L. Griswold; Walter N. Kirn; Scott A. Bardell

[57] ABSTRACT

The present invention relates to a permanently removable, low melt viscosity acrylic pressure-sensitive adhesive comprising a lower alkylacrylate, a higher alkylacrylate, at least one polar monomer and a crosslinker.

10 Claims, No Drawings

REMOVEABLE, LOW MELT VISCOSITY ACRYLIC PRESSURE SENSITIVE ADHESIVES

This application claims priority as a Continuation of U.S. patent application Ser. No. 07/816,593, filed Dec. 31, 1991, now abandoned.

FIELD OF INVENTION

The present invention relates to a permanently removable, low melt viscosity acrylic pressure-sensitive adhesive. In particular, the present invention relates to an adhesive comprising a lower alkyl acrylate, a higher alkyl acrylate, a polar monomer and a crosslinker.

BACKGROUND OF THE INVENTION

Removable pressure sensitive adhesives (PSA) adhered to a backing, which predictably adhere, yet remain repeatedly peelable from a variety of substrates over a long period of time without damaging or marring the substrate, have many commercial uses. For example, masking tapes, removable labels or office notes, protective films and medical tapes all must quickly adhere to metal, paper, plastics and skin, respectively, but must also peel smoothly away from these varied substrates without leaving behind any adhesive residue on or damaging the surface of a particular substrate.

Ideally, depending on the substrate, the removable adhesive must provide sufficient tack (or quick stick) to quickly fix the adhesive to the desired substrate, adequate peel strength to prevent damage of the surface when the adhesive is removed, and have the appropriate cohesive strength to control the transfer of adhesive to the substrate. Cohesive strength must also be controlled in order to limit the cold flow of the adhesive on a surface, a process which leads to an undesirable building of peel strength over time. Balancing these pressure sensitive adhesive properties, particularly in a removable adhesive, poses difficulties to the formulator.

U.S. Pat. No. 3,691,140 (Silver) discloses the use of solid, inherently tacky, pressure-sensitive adhesive microspheres which, when adhered to a first substrate, may when contacted to a second substrate be easily removed from the second substrate without delaminating the first substrate or the second substrate. While exhibiting a high degree of removability, microsphere adhesives tend to transfer to contact surfaces such as the second substrate.

U.S. Pat. No. 5,045,569 (Delgado) discloses hollow, inherently tacky pressure-sensitive adhesive acrylate microspheres which, due to their unique morphology, provide enhanced peel and shear strength and less adhesive transfer to substrates than "repositionable" adhesives based on solid acrylate-based microspheres.

U.S. Pat. No. 4,599,265 (Esmay) discloses an adhesive having a high degree of cohesive strength. The adhesive disclosed is an acrylate, has low tack and maintains peelability from a variety of ordinary substrates. Esmay teaches that through the crosslinking of the tape's adhesive layer and the use of low levels of polar monomer (up to 3 mole percent of a strongly polar monomer, such as acrylic acid) along with alkyl acrylates having side chains 4–12 carbons in length in the copolymeric adhesive, the required balance of low tack and high cohesive strength can be imparted to the removable adhesive. One possible drawback associated with the Esmay adhesive is that its monomers may bleed through a substrate such as paper prior to curing. Such bleeding is undesirable because of the damage done to the substrate.

U.S. Pat. No. 4,737,559 (Kellen et al.) describes a PSA formulation in which the viscous flow, and resultant adhesion buildup, is controlled through the addition of a small amount of a free radically polymerizable photocrosslinker (a mono-ethylenically unsaturated aromatic ketone, most preferably 4-acryloyl-oxy-benzophenone) to at least one alkyl acrylate or methacrylate. The Kellen et al. adhesive is formulated for adhesion to skin and at times, considered to be too aggressive for paper.

U.S. Pat. No. 3,635,754 (Beede) discloses the use of a heat-activated, multi-phase pressure-sensitive adhesive copolymer whose melting point is greater than 35° C. and whose glass transition temperature ($T_g$) is below 5° C. At room temperature, the adhesive is non-tacky. At that temperature, a crystalline or ordered phase and an amorphous or disordered phase co-exist. At skin temperature (approximately 35° C.), the copolymer becomes sufficiently amorphous to become tacky. This phenomenon may be reversed by cooling the adhesive for removal from a substrate, with the crystallization of the side chains providing sufficient cohesive strength to prevent any transfer of adhesive to the substrate.

World Patent Application Ser. No. 90/13420 (Stewart et al.) discloses a temperature activated, pressure-sensitive adhesive which is rapidly converted from non-tacky to tacky over a predetermined temperature range. Similar to the multi-phase adhesive of Beede, this temperature dependent adhesive relies on the careful selection of side chain crystallizable monomers, particularly those monomers which have linear aliphatic side chains of at least 10 carbon atoms, including $C_{14}$–$C_{22}$ alkyl acrylates or methacrylates. Stewart et al. specify that these compositions, when a mixture of copolymerizable monomers are used, must contain at least 50% by weight monomers with crystallizable side chains. However, at room temperature, these adhesives are substantially non-tacky.

U.S. Pat. No. 4,038,454 (Lehmann et al.) discloses a pressure-sensitive adhesive which comprises either a primary alkyl acrylate or a mixture of primary alkyl acrylates and crosslinker. Lehmann et al.'s alkyl acrylate contains at least four carbon atoms. If a mixture of primary alkyl acrylates is utilized, the primary alkyl acrylates can have carbon atoms which contain 1 to 14 carbon atoms. Half the carbon atoms should contain at least four carbon atoms in a mixture.

In using PSAs, it is also desirable to combine these removable qualities with the procedural, economical and environmental advantages of a hot melt processible adhesive. To date, most attempts to prepare acrylic hot melt PSAs have been limited because such materials have poor cohesive strength at room temperature or are too viscous even for use at high temperatures found in current melt processing equipment and practices. Maintaining sufficient cohesive strength, as noted above, is one critical factor in the formulation of permanently removable PSAs.

Typically, the cohesive strength of acrylic polymeric PSAs, which are not microspheres, may be improved in a variety of ways, but each way has its disadvantages, especially when the formulator wishes to maintain a low melt viscosity for the PSA. The molecular weight of the acrylic polymer may be raised to improve cohesive strength, but an unavoidable and unacceptable rise in melt viscosity also results. Polar monomer content, such as acrylic acid, may also be increased to improve cohesive strength, a property which is useful in many adhesive applications. However, increased polar monomer content has caused greater adhesion buildup, as described by U.S. Pat. No. 3,008,850 (Ulrich). Finally, cohesive strength may be enhanced through the covalent crosslinking of the adhesive. Covalent crosslinking, though providing the needed increase in cohesive strength, eliminates the potential for melt processing.

Physical crosslinking is described in U.S. Pat. No. 4,554,324 (Husman et al.). Husman et al. disclose a hot melt processible acrylate PSA which gains the needed balance of cohesive strength, high tack, and low melt viscosity through the chemical modification of the soft acrylate backbone by grafting reinforcing high polymeric moieties to the acrylate chain. These high moieties provide glassy domains which enhance the cohesive strength of the adhesive at lower temperatures without dramatically increasing the melt viscosity of the composition. The peel adhesion strengths of the exemplified compounds, however, tend to exceed those values which are required for removability from most substrates.

Thus, there currently exists a need for a removable acrylic pressure sensitive adhesive which displays a superior balance of tack, peel strength and cohesive strength at room temperature and which may be formulated for removal from a variety of substrates without damaging or depositing adhesive residue on the substrate and without building excessively in adhesion over time.

SUMMARY OF THE INVENTION

The present invention comprises a removable acrylic pressure-sensitive adhesive which displays a superior balance of tack, peel strength and cohesive strength at room temperature. The adhesives of the present invention can be removed from a variety of substrates without damaging or depositing adhesive residue on the substrate and without building excessively in adhesion over time.

The pressure-sensitive adhesive of the invention comprises:

a) from about 10 to about 50 percent by weight of at least one higher alkyl acrylate having an alkyl group from 12 to 26 carbon atoms;

b) from about 50 to about 90 percent by weight of at least one lower alkyl acrylate having an alkyl group from 4 to 12 atoms wherein said upper and lower alkyl acrylates cannot simultaneously have alkyl chains of 12 carbon atoms;

c) at least one polar monomer copolymerizable with said higher and lower alkyl acrylate;

d) sufficient crosslinker to impart enough cohesive strength to the adhesive in order to prevent substantial adhesive transfer.

The polar monomer of the pressure-sensitive adhesive of the present invention can comprise either a strongly polar and/or a moderately polar monomer and can comprise up to about 5% by weight polar monomer if it is a strong polar monomer and up to about 30% by weight polar monomer if it is a moderately polar monomer.

In a preferred embodiment of the present invention, the higher alkyl acrylate has a carbon group which has from 13 to 26 carbon atoms.

This invention also provides for pressure-sensitive adhesive sheets and tapes coated with the permanently removable, acrylic adhesive composition.

DETAILED DESCRIPTION OF THE INVENTION

The removable, low melt viscosity acrylic pressure-sensitive adhesive of the invention comprises four components: (1) at least one lower alkyl acrylate having an alkyl group which comprises from about 4 to 12 carbon atoms, (2) at least one higher alkyl acrylate having an alkyl group which comprises from about 12 to 26 carbon atoms (3) at least one polar monomer and (4) sufficient crosslinker to impart cohesive strength to the adhesive.

The linear or branched lower alkyl acrylate or methacrylate esters useful in preparing the removable, low melt viscosity pressure sensitive adhesives of this invention are linear or branched monofunctional unsaturated acrylate or methacrylate esters of non-tertiary alkyl alcohols, the alkyl groups of which have from about 4 to about 12 carbon atoms. These lower linear and branched acrylates, as is well known in the pressure sensitive adhesive art, provide the properties of low glass transition temperature and viscoelastic characteristics that result in materials which are tacky in nature. Examples of the shorter chain, lower alkyl acrylates and methacrylates used in the invention include, but are not limited to, n-butyl acrylate, isobutyl acrylate, 2-ethylhexyl acrylate, isooctyl acrylate, n-octyl acrylate, n-octyl methacrylate, 2-methylbutyl acrylate, isononyl acrylate, isoamyl acrylate, isodecyl acrylate, isodecyl methacrylate, 4-methyl-2-pentyl acrylate, and mixtures thereof. Preferred lower acrylate and methacrylate esters of the invention include isooctyl acrylate, n-butyl acrylate, and 2-ethylhexyl acrylate.

The higher alkyl acrylate or methacrylate monomers useful in preparing the pressure sensitive adhesives of this invention are monofunctional unsaturated acrylate or methacrylate esters of non-tertiary alkyl alcohols, the alkyl groups of which have from about 12 to about 26 carbon atoms. Preferably, the alkyl groups have from about 13 to about 26 carbon atoms. It is theorized that the long side chains of these acrylate and methacrylate esters increase the entanglement molecular weight of the polymer and facilitate the melt processing of the polymer. At the concentrations used in this invention, it is believed that the side chains do not crystallize substantially at room temperature and that the resulting polymers are amorphous. If there was substantial crystallization, the modulus of the material would increase causing a loss of pressure sensitive adhesive tack. The long alkyl chains of these acrylate and methacrylate esters also increase the non-polar character of the adhesive, thus reducing the specific inter-molecular interactions, such as hydrogen bonding, acid-base interaction, and the like, which lead to excessive adhesion build-up between the adhesives and substrates susceptible to such interactions.

Examples of the long side chain acrylate and methacrylate esters used in the present invention include, but are not limited to, lauryl acrylate, lauryl methacrylate, isotridecyl acrylate, n-tetradecyl acrylate, n-tetradecyl methacrylate, n-hexadecyl acrylate, n-hexadecyl methacrylate, n-octadecyl acrylate, n-octadecyl methacrylate, eicosanyl acrylate, hexacosanyl acrylate and mixtures thereof. Preferred long side chain alkyl acrylates and methacrylates include lauryl acrylate, lauryl methacrylate, octadecyl acrylate, octadecyl methacrylate, hexacosanyl acrylate, eicosanyl acrylate and isotridecyl acrylate.

The polar monomers used in the pressure-sensitive adhesive of the present invention can be either strongly polar and/or moderately polar. The polar monomers can be used singularly or in combination with other polar monomers.

Strong polar monomers include mono-, di-, and multifunctional carboxylic acids and salts such as acrylic acid, methacrylic acid, itaconic acid, crotonic acid, maleic acid and fumaric acid. Other suitable monomers include cyanoalkyl acrylates, acrylamides and acrylonitriles.

Moderately polar monomers include, but are not limited to, N-vinyl lactams, such as N-vinyl pyrolidone, vinyl halides, vinylidene chloride, vinyl toluene, styrene, hydroxyalkyl acrylates and/or methacrylates. 2-hydroxyethyl acrylate and 3-hydroxypropyl methacrylate are examples of suitable moderately polar monomers.

Crosslinkers are added to enhance the cohesive strength of the pressure-sensitive adhesive composition. Preferred crosslinkers useful when carboxylic acid moieties are utilized include multifunctional aziridine amides which have the general formula:

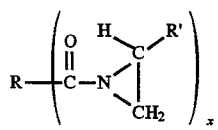

wherein R can be either an alkylene or aromatic group and R' can be a hydrogen or alkyl group. A suitable multifunctional aziridine amide includes 1,1'-(1,3-phenylenedicarbonyl)bis[2-methyl aziridine] which has the following formula:

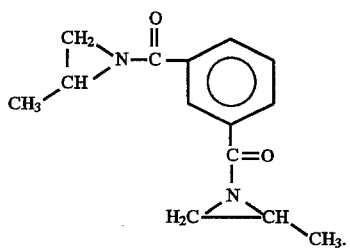

Another suitable multifunctional aziridine amide is 2,2,4-trimethyladipoyl bis [2-ethyl aziridine] which has the formula:

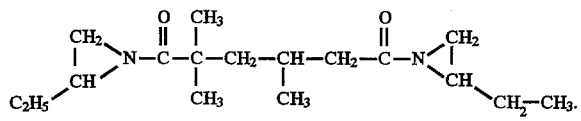

An additional multifunctional aziridine amide which can be utilized in the present invention is 1,1'-Azelaoyl bis [2-methyl aziridine] which has the following formula:

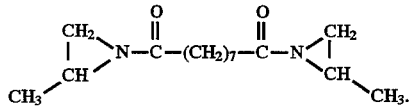

2,4,6-tris(2-ethyl-1-aziridinyl)-1,3,5 triazine which has the following formula is another example of a suitable multifunctional aziridine:

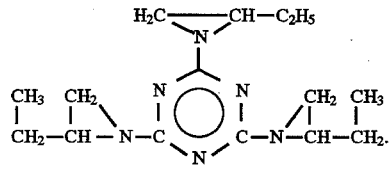

Another suitable group of crosslinkers employed when carboxylic acid moieties are employed include metal ion crosslinkers. Examples of suitable metal ion crosslinkers include copper, zinc, zirconium and chromium.

Especially preferred metal ion crosslinkers are chelated esters of ortho-titanic acid sold under the tradename Tyzor and commercially available from the E.I. du Pont de Numours Company. An especially preferred Tyzor is Tyzor AA which is titanium acetyl acetonate.

When hydroxy functional moderately polar monomers such as 2-hydroxyethyl acrylate or 3-hydroxypropyl methacrylate are utilized, polyfunctional isocyanate crosslinkers may be utilized. Useful polyfunctional crosslinkers include aromatic polyfunctional isocyanates such as toluene diisocyanate, aralkylene polyfunctional isocyanates such as his (4-isocyanato phenyl) methane, cycloaliphatic polyfunctional isocyanates such as his (4-isocyanato hexyl) methane and aliphatic polyfunctional isocyanates such as hexamethylene diisocyanate or tetramethylene diisocyanate.

Chromophore-substituted halomethyl-s-triazines, such as those described by U.S. Pat. No. 4,329,384 (Vesley et al.); U.S. Pat. No. 4,330,590 (Vesley); and U.S. Pat. No. 4,379,201 (Vesley), all of which are incorporated herein by reference, are also preferred crosslinking agents for compositions or applications which require no further melt processing or solvent casting.

Other crosslinkers which enhance the cohesive strength of the removable pressure-sensitive adhesive composition include, but are not limited to, multifunctional acrylates and methacrylates, and benzophenone- and acetophenone-derived photocrosslinking compounds.

Preferred crosslinkers are selected according to the processing method used in preparing the adhesives of this invention. For example, multifunctional aziridine amides and metal ions are utilized when thermal curing is required or when the adhesive is solution coated. For compositions which require no further melt processing following the initial polymerization, multifunctional acrylates and methacrylates, such as 1,4-butanediol diacrylate and 1,6-hexanediol diacrylate, can be used as crosslinkers. Additional polyfunctional acrylic monomers which can be used as crosslinkers in the present invention are disclosed in U.S. Pat. No. 4,379,201 (Heilmann et al.), which is incorporated herein by reference.

Silanes can also be used as crosslinkers. Suitable silanes include trialkoxy silanes having mono-ethylenically unsaturated functionality. Other suitable silanes include silanes having dialkoxy or monoalkoxy substituted silane groups having mono-ethylenically unsaturated functionality.

Compositions of the invention which require further processing and undergo crosslinking by exposure to ultraviolet radiation following the initial polymerization may employ several preferred classes of crosslinkers including: chromophore-substituted halomethyl-s-triazines, such as those in the Vesley Patents described above, all of which are incorporated herein by reference; and mono-ethylenically unsaturated aromatic ketones, particularly 4-acryloyl-oxy-benzophenone, as described by Kellen et al. in U.S. Pat. No. 4,737,559, which is incorporated herein by reference.

The pressure sensitive adhesive of this invention should comprise from about 10 to about 50% by weight of at least one linear or branched alkyl acrylate or methacrylate having from 12 to 26 carbon atoms; from about 50 to about 90% by weight of at least one lower alkyl acrylate; sufficient crosslinker to impart cohesive strength to the adhesive and up to about 5% by weight of at least one strong polar monomer or alternatively up to about 30% by weight of a moderately polar monomer. Generally, the amount of crosslinker varies from about 0.05% to about 1.0% by weight of the total composition. However, the amount of the crosslinker used depends upon the type of crosslinker used. Sufficient crosslinker should be utilized so that no adhesive transfer from a backing to a substrate can be visually observed. For example, when multifunctional aziridine amide is utilized, the amount of crosslinker, varies from about 0.10 to about 0.5% by weight of the total composition and for Tyzor AA the amount ranges from about 0.1 to about 0.75% by weight of the total composition. The range imparts to the adhesive enough tack to adhere to a contact surface and sufficient peel adhesion to allow a substrate coated with the adhesive to be easily removed from a contact surface.

The photocrosslinkable adhesives can be polymerized using suspension, emulsion and solution polymerization methods. In the preferred method, a solution polymerization method, the monomers along with the solvent and a copolymerizable crosslinker are charged into a four-neck reaction vessel which is equipped with a stirrer, a thermometer, a condenser, addition funnel and a thermowatch. After the vessel is charged, a concentrated thermal initiator solution is added to the addition funnel. The whole reaction vessel and addition funnel with their contents are then purged with nitrogen to create an inert atmosphere. Once purged, the solution within the vessel is stirred and heated to about 55° C. and the initiator is added. A 98 to 99% conversion should be obtained after about 20 hours.

If the solution is then coated onto a substrate and no further processing is desired, the coating can be cured by exposure to ultraviolet light.

If the solution is not cast, but instead a hot melt coating is desired, the solvent is stripped. The solvent is stripped by applying the mixture onto a siliconized release liner which is then oven dried. Thus, an adhesive product is left in solid form. The adhesive is then heated from about 145° C. to about 170° C. to reduce melt viscosity, coated onto a suitable substrate and then cured by exposure to an ultraviolet light source.

Another method of applying the adhesive of the present invention comprises UV prepolymerization of the monomer mixture to a syrup-like consistency, followed by the addition of a crosslinker. Next, this syrup-like mixture is knife-coated onto a substrate and UV polymerized in an inert atmosphere to yield the finished adhesive coating.

The adhesive of the present invention can also be polymerized by charging the monomers with solvent, initiator and a silane crosslinker into a three-neck reaction vessel equipped with a stirrer, a thermometer, a thermowatch and condenser. After the monomer is charged into the reaction vessel, the whole reaction vessel with its contents is purged with nitrogen and heated to 55° C. After about 20 hours, a 97 to 98% conversion should be obtained. The material is then coated on a substrate and dried in an oven. Typically, a catalyst can be added to the solution prior to coating and oven drying. In the presence of moisture, a crosslinked adhesive is obtained and no further processing is required.

The removable PSA of the present invention, depending upon its viscosity, can be coated via any of a variety of conventional coating methods, such as roll coating, knife coating, hot melt coating, or extrusion. The composition can be applied to at least a portion of at least one surface of suitable flexible or inflexible backing or sheet and cured to produce PSA-coated sheet materials. For example, it can be placed on a backing to form a tape. Or it can be applied to a sheet to form pressure sensitive sheets. For some purposes, it is preferred that the adhesive be coated on both sides of a sheet. Those skilled in the art will recognize that the novel adhesive can be applied to a variety of sheets and backings and can be simultaneously coated on both sides of the sheet or backing. Useful flexible backing materials include paper, plastic films such as poly(propylene), poly(ethylene), poly (vinyl chloride), poly(tetrafluoroethylene), polyester [e.g., poly(ethylene) terephthalate)], polyimide film such as DuPont's Kapton™, cellulose acetate and ethyl cellulose. Backings can also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backings can be formed of metal, metallized polymeric film or ceramic sheet material. PSA-coated sheet materials can take the form of any article conventionally known to be utilized with PSA compositions, such as labels, tapes, transfer tapes (comprising a film of the PSA borne on at least one release liner), signs, covers, marking indices, and the like. Primers can be utilized, but they are not always necessary.

Test Methods

Peel Adhesion

Peel adhesion is the force required to remove a coated flexible sheet material from a test substrate measured at a specific angle and rate of removal. In the examples, this force is expressed in Newtons per decimeter (dm) width of coated sheet. The procedure followed is:

A strip 0.127 dm in width of the sheet coated with the adhesive to be tested is applied to the horizontal surface of paper test substrate with at least 1.27 lineal dm in firm contact. Three passes in each direction with a 2 kg hard rubber roller are used to apply the strip. If air bubbles are entrapped between the test substrate and the test strip, the sample is discarded. The free end of the coated strip is doubled back nearly touching itself so the angle of removal will be 180°. The free end is attached to an adhesion tester load cell. The paper test substrate is adhered to the plate of an I-mass 3M-90 Peel Tester which is capable of moving the substrate away from the load cell at a constant rate of 0.3 meters per minute. The dwell time after roll down is specified in the tables below. The scale reading in Newtons is recorded as the tape is peeled from the glass surface.

Abbreviations and Tradenames

AA—acrylic acid
ABP—4-acryl-oxy-benzophenone
ACM—acrylamide
ACN—acrylonitrile
BAm—bis-aziridine amide or 1,1'-(1,3-phenylenedicarbonyl) bis [2-methyl aziridine]
EtOAc—ethyl acetate
HEA—2-hydroxy-ethylacrylate
HMDI—bis(4'isocyanato hexyl)methane
HPMA—3-hydroxy propylmethacrylate
IOA—isooctyl acrylate
ITAA—itaconic acid
ODA—octadecyl acrylate
ODMA—octadecyl methacrylate
Tyzor AA—titanium acetyl acetonate, available from the E.I. du Pont de Nemours Company p0 VAZO™ 64-2,2'-azobis(isobutyronitrile), available from the E.I. du Pont de Nemours Company.

The percentages in this specification and appended claims are all percentages by weight unless otherwise noted.

EXAMPLE 1

In a 500 ml four-necked reaction vessel, equipped with a stirrer, thermometer, condenser, addition funnel and thermowatch, 68 grams of IOA, 62 grams of ODA (@ 48% solids, in EtOAc), 2 grams acrylic acid, 107.5 grams of ethyl acetate, and 0.2 grams of ABP were charged. A solution of 0.3 grams VAZO™ 64 in 10 grams of ethyl acetate was added to the addition funnel. Both the solution in the reaction vessel and the materials in the addition funnel were then purged with argon (or nitrogen). The solution in the reaction vessel was stirred while heated to 55° C. and initiator was added. After about 20 hours, a 98–99% conversion was obtained. The mixture was then coated from solution on twenty pound bond paper from the Georgia-Pacific Company and oven dried for 10 minutes at 65° C. An oven dried coating thickness of about 1.0 mil of the adhesive was obtained. The coating was passed three times under UV light (PPG UV processor equipped with medium pressure mercury lamps at 300 Watts/2.5 cm) at 25 meters/min.

The coated paper was then applied to a sheet of copy paper as described in the peel adhesion test. Peel adhesion was then measured for samples from the test substrate after dwell of one day and one week.

The composition, the weight percentage of the components and the test results are reported in Table 1.

EXAMPLES 2–4 AND COMPARATIVE EXAMPLES C-1 AND C-2

Examples 2–4 and Comparative Examples C-1 and C-2 were prepared in accordance with the procedure outlined in Example 1. The composition, the weight percentage of the components and the test results are reported in Table 1.

TABLE 1

| | Peel Adhesion (N/dm) | | | |
|---|---|---|---|---|
| | | | Paper (N/dm) | |
| Ex. | Composition | Wt. % | 1 Day | 1 Week |
| 1 | IOA/ODA/AA/ABP | 68/30/2/0.2 | 30.2 | 26.1 |
| 2 | IOA/ODA/AA/ABP | 66/30/4/0.2 | 49.9 | 52.8 |
| C-1 | IOA/ODA/AA/ABP | 64/30/6/0.2 | TEAR | TEAR |
| 3 | IOA/ODA/ITAA/ABP | 68/30/2/0.2 | 26.9 | 21.2 |
| 4 | IOA/ODA/ITAA/ABP | 66/30/4/0.2 | 42.9 | 25.0 |
| C-2 | IOA/ODA/ITAA/ABP | 64/30/6/0.2 | 51.4 | TEAR |

The test results indicate that good peel adhesion was obtained with the composition of the present invention.

EXAMPLES 5–10

Examples 5–10 examined the use of the multifunctional aziridine amide [1,1'-(1,3-phenylenedicarbonyl bis [2-methyl aziridine] as a crosslinker. These examples were prepared in accordance with the procedure outlined in Example 1 with the exception that the multifunctional aziridine amide was utilized instead of the ABP. The multifunctional aziridine amide was added just prior to coating. The composition, the weight percentage of the components and the test results are reported in Table 2.

TABLE 2

| | Peel Adhesion (N/dm) | | | |
|---|---|---|---|---|
| | | | Paper (N/dm) | |
| Ex. | Composition | Wt. % | 1 Day | 1 Week |
| 5 | IOA/ODA/AA/BAm | 68/30/2/0.05 | 53.0 | 77.1 |
| 6 | IOA/ODA/AA/BAm | 68/30/2/0.1 | 51.2 | 65.5 |
| 7 | IOA/ODA/AA/BAm | 68/30/2/0.15 | 27.8 | 54.3 |
| 8 | IOA/ODA/AA/BAm | 68/30/2/0.5 | 11.5 | 18.6 |
| 9 | IOA/ODA/AA/BAm | 68/30/2/0.75 | 5.17 | 9.79 |
| 10 | IOA/ODA/AA/BAm | 68/30/2/1.0 | 5.41 | 8.45 |

The test results indicate that good peel adhesion was obtained with the composition of the present invention.

EXAMPLES 11–22 AND COMPARATIVE EXAMPLES C-3

Examples 11–22 examined the use of the moderately polar monomers, 2-hydroxy-ethyl acrylate and 3-hydroxypropyl methacrylate. These examples were prepared in accordance with the procedure outlined in Example 1 except that a total of 200 g of ethyl acetate was utilized. The composition, the weight percentage of the components and the test results are reported in Table 3.

TABLE 3

| | Peel Adhesion (N/dm) | | | |
|---|---|---|---|---|
| | | | Paper | |
| Ex. | Composition | Wt. % | 1 Day | 1 Week |
| 11 | IOA/ODA/HEA/ABP | 64/30/6/0.2 | 10.3 | 12.2 |
| 12 | IOA/ODA/HEA/ABP | 62/30/8/0.2 | 7.57 | 11.5 |
| 13 | IOA/ODA/HEA/ABP | 60/30/10/0.2 | 14.8 | 17.3 |
| 14 | IOA/ODA/HEA/ABP | 58/30/12/0.2 | 27.4 | 23.2 |
| 15 | IOA/ODA/HEA/ABP | 55/30/15/0.2 | 29.6 | 29.6 |
| 16 | IOA/ODA/HEA/ABP | 40/30/30/0.2 | 5.9 | 5.0 |
| 17 | IOA/ODA/HPMA/ABP | 64/30/6/0.2 | 3.83 | 3.79 |
| 18 | IOA/ODA/HPMA/ABP | 62/30/8/0.2 | 6.97 | 7.99 |
| 19 | IOA/ODA/HPMA/ABP | 60/30/10/0.2 | 4.22 | 3.77 |
| 20 | IOA/ODA/HPMA/ABP | 58/30/12/0.2 | 14.4 | 9.6 |
| 21 | IOA/ODA/HPMA/ABP | 55/30/15/0.2 | 15.8 | 19.3 |
| 22 | IOA/ODA/HPMA/ABP | 50/30/20/0.2 | 20.8 | 21.0 |
| C-3 | IOA/ODA/HEA/ABP | 30/30/40/0.2 | TEAR | — |

The test results indicate that good peel adhesion was obtained with the composition of the present invention. Comparative C-3 illustrates the need to limit the amount of polar monomer in the present invention,

EXAMPLES 23–34

Examples 23–34 examined the use of various polar monomers. These examples were prepared in accordance with the procedure outlined in Example 1. The composition, the weight percentage of the components and the test results are reported in Table 4.

TABLE 4

Peel Adhesion (N/dm)

| Ex. | Composition | Wt. % | Paper 1 Day | 1 Week |
|-----|-------------|-------|-------|--------|
| 23 | IOA/ODA/ACN/ABP | 68/30/2/0.4 | 6.76 | 10.7 |
| 24 | IOA/ODA/ACN/ABP | 66/30/4/0.4 | 2.17 | 2.41 |
| 25 | IOA/ODA/ACN/ABP | 64/30/6/0.4 | 0.63 | .31 |
| 26 | IOA/ODA/ACM/ABP | 68/30/2/0.4 | 8.69 | 11.2 |
| 27 | IOA/ODA/ACM/ABP | 66/30/4/0.4 | 17.2 | 26.5 |
| 28 | IOA/ODA/ACM/ABP | 64/30/6/0.4 | 49.7 | 32.0 |
| 29 | IOA/ODA/HEA/ABP | 68/30/2/0.4 | 5.08 | 5.91 |
| 30 | IOA/ODA/HEA/ABP | 66/30/4/0.4 | 5.63 | 6.35 |
| 31 | IOA/ODA/HEA/ABP | 64/30/6/0.4 | 10.3 | 12.2 |
| 32 | IOA/ODA/HPMA/ABP | 68/30/2/0.4 | 8.03 | 9.63 |
| 33 | IOA/ODA/HPMA/ABP | 66/30/4/0.4 | 8.08 | 10.3 |
| 34 | IOA/ODA/HPMA/ABP | 66/30/6/0.4 | 4.88 | 4.60 |

The test results reveal that good peel adhesion was obtained with the composition of the present invention.

EXAMPLES 35–39

Examples 35–39 examined the use of the crosslinker Tyzor AA. These examples were prepared in accordance with the procedure outlined in Example 1 except that no ABP was utilized and that the Tyzor AA was added just prior to coating. The composition, the weight percentage of the components and the test results are reported in Table 5.

TABLE 5

Peel Adhesion (N/dm)

| Ex. | Composition | Wt. % | Paper 1 Day | 1 Week |
|-----|-------------|-------|-------|--------|
| 35 | IOA/ODA/AA/Tyzor AA | 68/30/2/0.1 | 21.7 | 24.3 |
| 36 | IOA/ODA/AA/Tyzor AA | 68/30/2/0.25 | 37.2 | 25.2 |
| 37 | IOA/ODA/AA/Tyzor AA | 68/30/2/0.5 | 16.2 | 13.6 |
| 38 | IOA/ODA/AA/Tyzor AA | 68/30/2/0.75 | 6.79 | 10.7 |
| 39 | IOA/ODA/AA/Tyzor AA | 68/30/2/1.0 | 2.87 | 4.82 |

The test results reveal that good peel adhesion was obtained with the composition of the present invention.

EXAMPLES 40–42

Examples 40–42 examined the use of an isocyanate crosslinker. These examples were prepared in accordance with the procedure outlined in Example 1. The composition, the weight percentage of the components are reported in Table 6.

TABLE 6

Peel Adhesion (N/dm)

| Ex. | Composition | Wt. % | Paper 1 Day | 1 Week |
|-----|-------------|-------|-------|--------|
| 40 | IOA/HEA/ODA/HMDI | 65/5/30/0.05 | 53.9 | 67.9 |
| 41 | IOA/HEA/ODA/HMDI | 65/5/30/0.1 | 23.9 | 40.9 |
| 42 | IOA/HEA/ODA/HMDI | 65/5/30/0.25 | 4.4 | 6.3 |

The test results reveal that good peel adhesion was obtained with the composition of the present invention.

In summary, novel adhesive compositions having a low melt viscosity have been described. Although specific embodiments and examples of the present invention have been described herein, it should be borne in mind that these are by way of explanation and illustration and the present invention is not limited thereby. Certainly modifications which are within the ordinary skill in the art are considered to lie within the scope of this invention as defined by the following claims including all equivalents.

We claim:

1. An acrylic pressure-sensitive adhesive comprising the reaction product of:
   a.) a mixture of higher and lower alkyl acrylates comprising:
      i.) about 10 to about 50% by weight of at least one higher alkyl acrylate having an alkyl group which contains about 18 to about 26 carbon atoms; and
      ii.) about 90 to about 50% by weight of at least one lower alkyl acrylate having an alkyl group which contains about 4 to about 12 carbon atoms;
   b.) at least one strongly polar monomer copolymerizable with the higher and lower alkyl acrylates present in an amount of up to 5 percent by weight, wherein the sum of a.) and b.) equals 100 percent; and
   c.) about 0.05 to about 1.0 percent by weight of the sum of a.) and b.) of a crosslinking agent selected from the group consisting of multifunctional aziridine amides, metal ions, mono-ethylenically unsaturated aromatic ketones, chromophore-substituted halomethyl-s-triazines, multifunctional acrylates, multifunctional methacrylates, benzophenones, acetophenones, silanes, and mixtures thereof, wherein the adhesive is amorphous and wherein the adhesive is tacky at room temperature.

2. The adhesive of claim 1 wherein the higher alkyl acrylate is selected from the group consisting of alkyl acrylates having alkyl groups containing 18 carbon atoms and alkyl acrylates having alkyl groups containing 22 carbon atoms.

3. An adhesive coated sheet material bearing an adhesive composition on a portion of at least one major surface, the adhesive composition comprising the reaction product of:
   a.) a mixture of higher and lower alkyl acrylates comprising:
      i.) about 10 to about 50% by weight of at least one higher alkyl acrylate having an alkyl group which contains about 18 to about 26 carbon atoms; and
      ii.) about 90 to about 50% by weight of at least one lower alkyl acrylate having an alkyl group which contains about 4 to about 12 carbon atoms;
   b.) at least one strongly polar monomer copolymerizable with the higher and lower alkyl acrylates present in an amount of up to 5 percent by weight, wherein the sum of a.) and b.) equals 100 percent; and c.) about 0.05 to about 1.0 percent by weight of the sum of a.) and b.) of a crosslinking agent selected from the group consisting of multifunctional aziridine amides, metal ions, mono-ethylenically unsaturated aromatic ketones, chromophore-substituted halomethyl-s-triazines, multifunctional acrylates, multifunctional methacrylates, benzophenones, acetophenones, silanes, and mixtures thereof, wherein the adhesive is amorphous and wherein the adhesive is tacky at room temperature.

4. The adhesive coated sheet material of claim 3 wherein the higher alkyl acrylate is selected from the group consisting of alkyl acrylates having alkyl groups containing 18 carbon atoms and alkyl acrylates having alkyl groups containing 22 carbon atoms.

5. The pressure sensitive adhesive of claim 1 wherein the strongly polar monomer is selected from the group consisting of monofunctional carboxylic acid monomers, multifunctional carboxylic acid monomers, cyanoalkyl acrylates, acrylamides, acrylonitriles, and mixtures thereof.

6. The adhesive coated sheet material of claim 3 wherein the strongly polar monomer is selected from the group consisting of monofunctional carboxylic acid monomers, multifunctional carboxylic acid monomers, cyanoalkyl acrylates, acrylamides, acrylonitriles, and mixtures thereof.

7. An acrylic pressure-sensitive adhesive comprising the reaction product of:

a.) a mixture of higher and lower alkyl acrylates comprising:
   i.) about 10 to about 50% by weight of at least one higher alkyl acrylate having an alkyl group which contains about 18 to about 26 carbon atoms; and
   ii.) about 90 to about 50% by weight of at least one lower alkyl acrylate having an alkyl group which contains about 4 to about 12 carbon atoms;

b.) at least one moderately polar monomer copolymerizable with the higher and lower alkyl acrylates present in an amount of up to 30 percent by weight, wherein the sum of a.) and b.) equals 100 percent; and c.) about 0.05 to about 1.0 percent by weight of the sum of a.) and b.) of a crosslinking agent selected from the group consisting of multifunctional acrylates, multifunctional methacrylates, acetophenones, benzophenones, chromophore-substituted halomethyl-s-triazines, silanes, mono-ethylenically unsaturated aromatic ketones, multifunctional isocyanates, and mixtures thereof, wherein the adhesive is amorphous and wherein the adhesive is tacky at room temperature.

8. The pressure sensitive adhesive of claim 7 wherein the moderately polar monomer is selected from the group consisting of hydroxy alkyl acrylates, vinyl halides, vinyl toluenes, styrenes, hydroxyalkyl methacrylates, N-vinyl-lactams, and mixtures thereof.

9. An adhesive coated sheet material bearing an adhesive composition on a portion of at least one major surface, the adhesive composition comprising the reaction product of:

a.) a mixture of higher and lower alkyl acrylates comprising:
   i.) about 10 to about 50% by weight of at least one higher alkyl acrylate having an alkyl group which contains about 18 to about 26 carbon atoms; and
   ii.) about 90 to about 50% by weight of at least one lower alkyl acrylate having an alkyl group which contains about 4 to about 12 carbon atoms;

b.) at least one moderately polar monomer copolymerizable with the higher and lower alkyl acrylates present in an amount of up to 30 percent by weight, wherein the sum of a.) and b.) equals 100 percent; and c.) about 0.05 to about 1.0 percent by weight of the sum of a.) and b.) of a crosslinking agent selected from the group consisting of multifunctional methacrylates, benzophenones, chromophore-substituted halomethyl-s-triazines, silanes, mono-ethylenically unsaturated aromatic ketones, multifunctional isocyanates, multifunctional acrylates, and mixtures thereof, wherein the adhesive is amorphous and wherein the adhesive is tacky at room temperature.

10. The adhesive coated sheet material of claim 9 wherein the moderately polar monomer is selected from the group consisting of hydroxy alkyl acrylates, vinyl halides, vinyl toluenes, styrenes, hydroxyalkyl methacrylates, N-vinyl-lactams, and mixtures thereof.

* * * * *